United States Patent

Fujihara et al.

Patent Number: 5,673,891
Date of Patent: Oct. 7, 1997

[54] CUP HOLDER

[75] Inventors: Kazuo Fujihara, Aichi-ken; Akira Azumi, Gifu-Ken, both of Japan

[73] Assignee: Toyoda Gosei Co., Ltd., Aichi, Japan

[21] Appl. No.: 430,594

[22] Filed: Apr. 28, 1995

[30] Foreign Application Priority Data

Apr. 28, 1994 [JP] Japan ................................. 6-092511

[51] Int. Cl.$^6$ .................................................. A47K 1/08
[52] U.S. Cl. .................................. 248/311.2; 297/188.17; 312/334.46
[58] Field of Search ............................. 248/311.2, 685; 297/188.15, 188.16, 188.17; 312/319.1, 330.1, 334.46; 224/926

[56] References Cited

U.S. PATENT DOCUMENTS

| | | | |
|---|---|---|---|
| 3,537,770 | 11/1970 | Evans et al. | 312/330.1 X |
| 3,637,184 | 1/1972 | O'Brien | 248/311.2 X |
| 3,784,142 | 1/1974 | O'Brien | 248/311.2 |
| 4,441,771 | 4/1984 | Roesler | 312/330.1 X |
| 4,953,771 | 9/1990 | Fischer et al. | 248/311.2 X |
| 5,171,061 | 12/1992 | Marcusen | 248/311.2 X |
| 5,171,075 | 12/1992 | Nagano et al. | |
| 5,228,611 | 7/1993 | Yabuya. | |
| 5,232,262 | 8/1993 | Tseng | 248/311.2 X |
| 5,297,709 | 3/1994 | Dykstra et al. | 248/311.2 X |
| 5,379,978 | 1/1995 | Patel et al. | 248/311.2 |
| 5,395,084 | 3/1995 | Ikuma | 224/926 X |
| 5,433,517 | 7/1995 | Fleisch | 312/334.46 X |

*Primary Examiner*—Leslie A. Braun
*Assistant Examiner*—Anita M. King
*Attorney, Agent, or Firm*—Cushman Darby & Cushman IP Group of Pillsbury Madison & Sutro LLP

[57] ABSTRACT

A cup holder has a retractable body and a receptacle. The receptacle is fixed to a vehicle and the body is slidably engaged with the receptacle and movable from a first retracted position inside the receptacle to second extracted, cup-holding position. A portion of the body extends outside the receptacle to hold a cup. The cup holder includes a movable cup support member moving with respect to the body from a first lifted position when the body is retracted to a second lowered position for supporting a bottom of the cup when the body is in the second cup-holding position. A cam surface is fixed to the receptacle. A follower is connected to the cup-support and engaging the cam surface such that the follower causes the cup support to pivot from its raised position to its lowered position according to the shape of the cam surface when the body is extended and from its first position to its second position. The follower is in continuous engagement with the cam surface at all positions of the body.

27 Claims, 6 Drawing Sheets

CUP HOLDER

FIELD OF THE INVENTION

The present invention relates to a cup holder for use in an automobile.

DESCRIPTION OF THE RELATED ART

Cup holders are used to hold cups containing liquids securely in vehicles, such as automobiles and vessels, which vibrate during movement.

Figure 7:
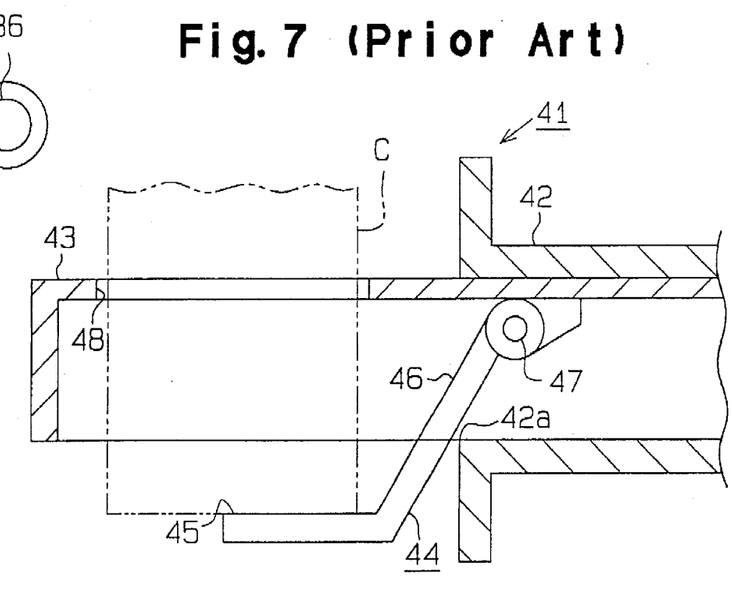
FIG. 7 is a cross-sectional view showing a conventional upholder.

As shown in FIG. 7, a cup holder 41 includes a holder body 43, a receptacle 42 for accommodating the body 43, and a tray member pivotally attached to the body 43 by means of a shaft 47. The tray member 44 comprises an arm 46 and a cup tray 45. The body 43 is provided with a cup supporting aperture 48. To use the cup holder 41, the body 43 is pulled out from the receptacle 42. The tray 45 supports a bottom of a cup C inserted into the aperture 48.

When the cup holder 41 is not in use, the body 43 is folded and accommodated in the receptacle 42. By pushing the body 43 inward, a portion 42a of the receptacle 42 abuts against the rear surface of the arm 46. By further pushing the body 43 into the receptacle 42, the portion 42a lifts the arm. This causes the tray member 44 to pivot about the shaft 47 in a clockwise direction. On the other hand, when the body 43 is pulled out, the tray member 44 engages the portion 42a and pivots in a counterclockwise direction.

In the above cup holder 41, the tray member 44 jolts and rattles when the arm 46 is lifted by the portion 42a of the receptacle 42. This is unpleasing to the user, and gives an impression of low quality. As a result, the aforementioned deficiency does not follow the recent trend of consumers preferring high quality goods.

SUMMARY OF THE INVENTION

It is an object of the present invention to provide a cup holder which is smoothly inserted into and extracted from a receptacle.

To achieve the above object, an improvement of a cup holder is proposed. The cup holder has a retractable body and a receptacle. The receptacle is fixed to a vehicle and the body is engaged with the receptacle and movable from a retracted position inside the receptacle to an extended cup-holding position. A portion of the body extends outside the receptacle to hold a cup. The cup holder includes a movable cup support which moves with respect to the body from a raised position when the body is retracted to a lowered position for supporting a bottom of the cup when the body is extended to the cup-holding position. The cup holder further includes a cam surface fixed to the receptacle, and a follower connected to the cup support and engaging the cam surface such that the follower causes the cup support to pivot from its raised position to its lowered position when the body is extended and from its lowered position to its raised position when the body is retracted according to the shape of the cam means. The follower is in continuous engagement with the cam surface at all positions of the body.

In a preferred embodiment of the present invention a cup holder is provided comprising a body for holding a cup, a receptacle for containing the body and a support member pivotally connected to the body for supporting the bottom of a cup. The receptacle is slidably engaged to the body and configured to allow the body to slide from a first retracted position wherein the body is inside the receptacle, to a second extracted position wherein at least a portion of the body is outside the receptacle. The body is configured to support a cup in the second position. The receptacle has a cam surface fixed thereto. The cup support member is pivotally connected to the body and has a cam follower in continuous engagement with the cam surface of the receptacle. The cup support member is thus caused to pivot from a first raised position when the body is in the first retracted position to a second lowered position configured to support a cup when the body is in the second extracted position at least partially outside the receptacle.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1(b) is a perspective view showing the entire structure of the cup holder according to the present invention;

DETAILED DESCRIPTION OF THE PREFERRED EMBODIMENT

Hereinafter, an embodiment according to the present invention will be described with reference to FIGS. 1(a) to 6. The cup holder is provided integrated with a center cluster, arm rest, or the like in an automobile. In the description given below, the direction "forward" is defined as a direction to the left in FIG. 2, and "backward" is defined as a direction to the right in FIG. 2. "Left" is the direction diagonal and toward the upper left corner of FIG. 2, and "Right" is the direction diagonal and to the lower right corner of FIG. 2. "Up" is the direction toward the top in FIG. 2, and "down" is the direction toward the bottom in FIG. 2.

Figure 2:
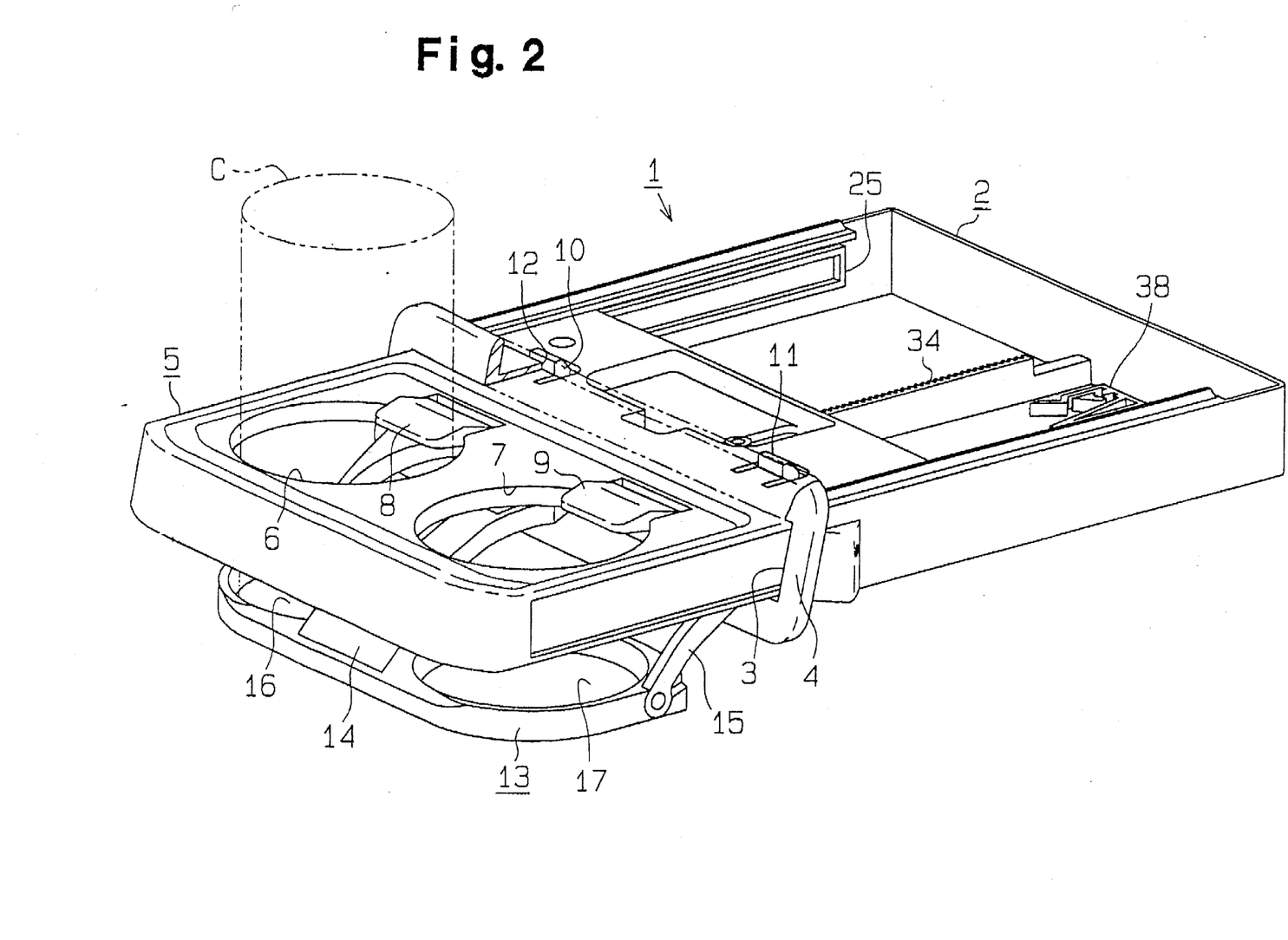

FIG. 2 illustrates a cup holder 1 according to one embodiment of the present invention. A receptacle 2 having a rectangular box shape is fixed, for example in this embodiment, to the arm rest of a vehicle. The receptacle 2 has a front side, an opening 3 defined in the front side, and an ornamental frame 4 surrounding the opening 3.

The receptacle 2 accommodates a holder body 5 which can be drawn out from the receptacle 2 through the opening 3. Cup support apertures 6, 7 are provided in the body 5. Adjacent to each aperture 6, 7 is a pressing plate 8, 9 respectively attached thereto. Each plate 8, 9 is spring-biased horizontally to extend toward the center of its respective aperture 6, 7. Application of force to the upper surface of the plates 8, 9 forces the plates 8, 9 to pivot downward. A pair of protrusions 10, 11 is formed on a rear upper surface of the body 5, and aligned with the apertures 6, 7. Each of the protrusions 10, 11 abuts against a rear edge 12 of the ornamental surface 4 and prevents the body 5 from separating from the receptacle 2.

A cup tray 13 is connected to the body 5 by arms 14, 15. Two arms are provided at the left and right sides of body 5, and arm 14 is provided in the middle of body 5. The lower ends of the arms 15 are pivotally connected to extend upward from a rear portion of tray 13, and the lower end of arm 14 is pivotally connected to extend upward from a front portion of the tray 13. (Hereinbelow, the arm 14 is referred to as front arm 14, and arms 15 are referred to as rear arms 15.) Cup receiving recesses 16, 17 are formed in an upper surface of the tray 13. Each recess 16, 17 is positioned below an associated aperture 6, 7 when the body 5 is extracted from the receptacle 2. The tray 13 and the arms 14, 15 constitute the support member in this embodiment.

In the cup holder 1 described above, a cup C (or can, or other container) is held in each of the apertures 6, 7 and associated recess 16, 17 when the body 3 is extracted from the receptacle 2. Each spring-biased plate 8, 9 firmly applies pressure to the outer circumferential surface of a cup C. Accordingly, the effective diameter of each aperture 6, 7 is varied by the position of each plate 8, 9, respectively, as the end of each plate 8, 9 comes into contact with the outer surface of a cup C. Consequently, a cup C inserted into one or both of apertures 6, 7 is stably held by the plates 8, 9.

A mechanism for connecting the body 5 to the tray 13 will now be explained.

Figure 1A:
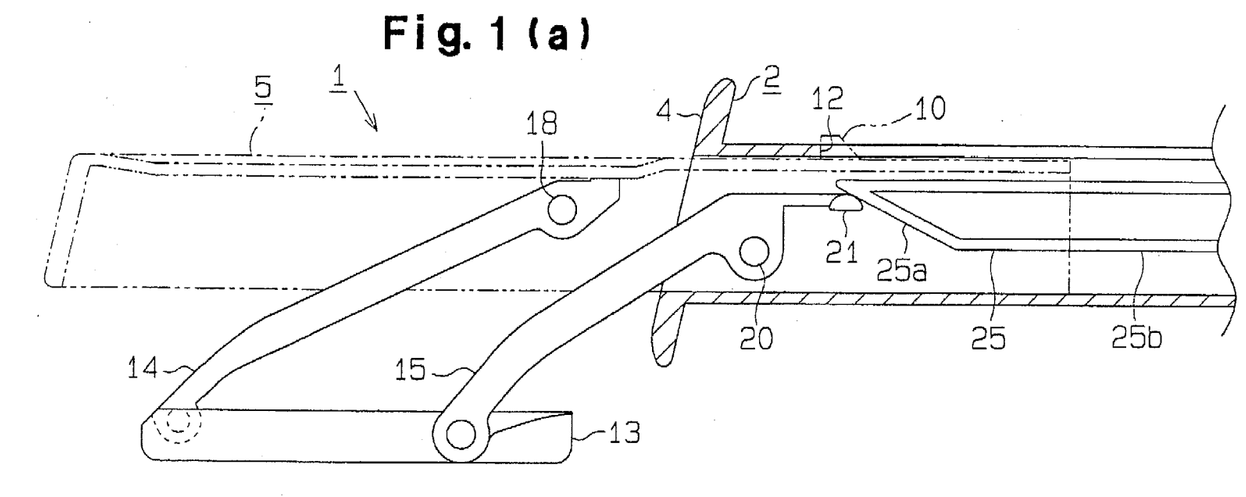
FIG. 1(a) is a cross-sectional view showing a cup holder according to an embodiment of the present invention, in which a holder body is fully extracted from a receptacle.
Figure 1B:
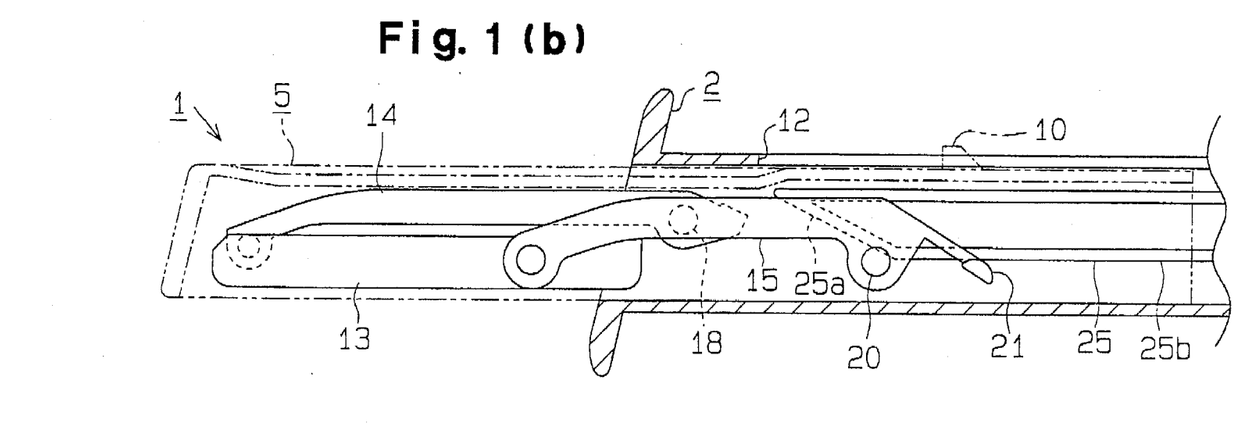
FIG. 1(b) is a cross-sectional view showing the holder body partly extracted from the receptacle.
Figure 3:
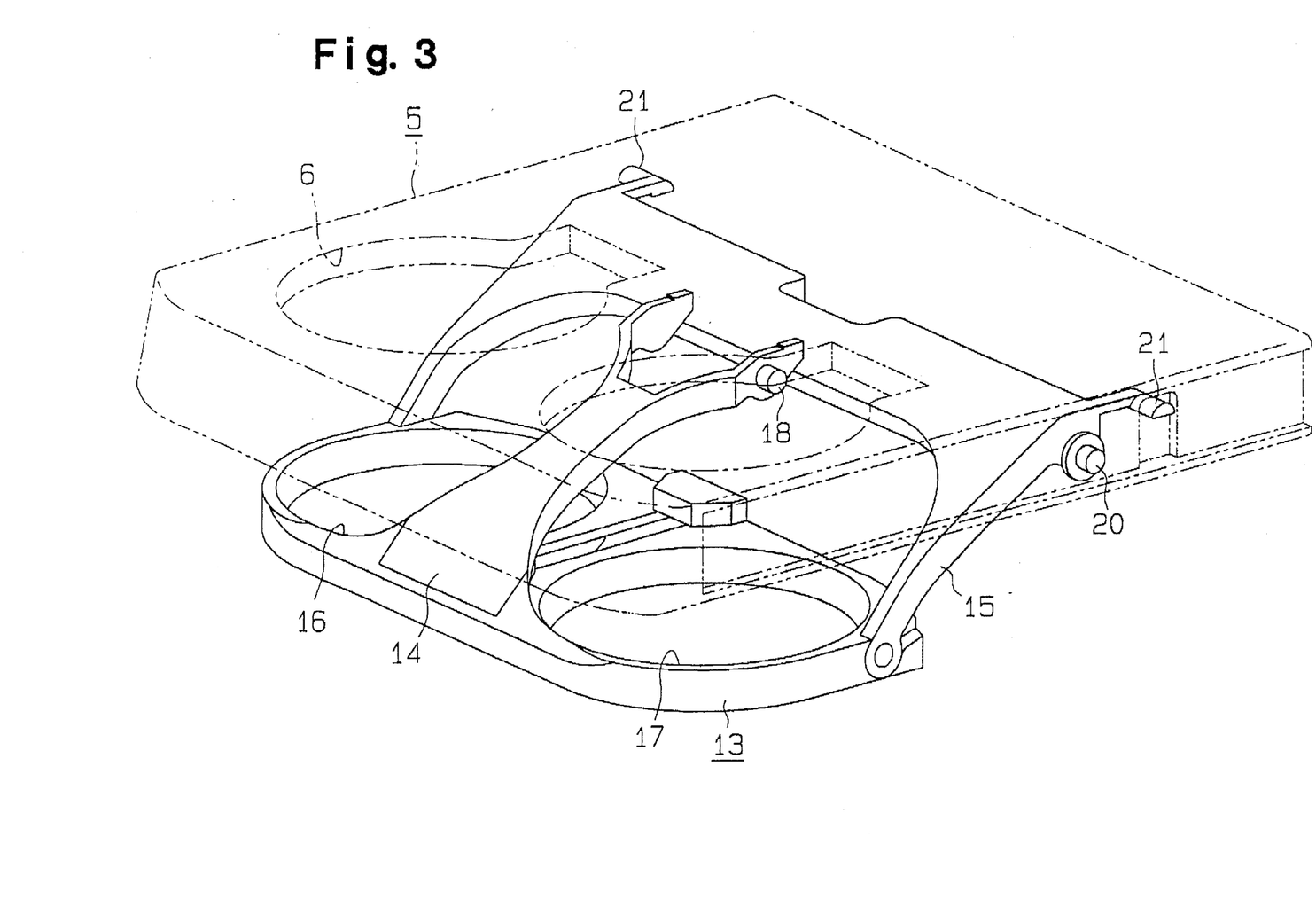
FIG. 3 is a perspective view showing an arm and a cup

As shown in FIG. 3, the front arm 14 has a Y-shaped configuration. The bottom end of the front arm 14 is pivotally connected to the front middle section of the tray 13 as shown in FIGS. 1(a) and 1(b). Shafts 18 are provided at the top end of the front arm 14. The bottom ends of rear arms 15 are pivotally connected toward the rear of the left and right sides of the tray 13. Projections 21, which have semicircular cross sections and serve as cam followers, are formed on the rear end of each rear arm 15 and extend outward to the left and right, respectively. A shaft 20 is formed on each rear arm 15 in front of respective projection 21. Shafts 20 serve as pivot points about which rear arms 15 can pivot. Projections 21 are thus positioned away from the pivot axes provided by shafts 20 of the support member (namely cup tray 13 and arms 14, 15).

Figure 4:
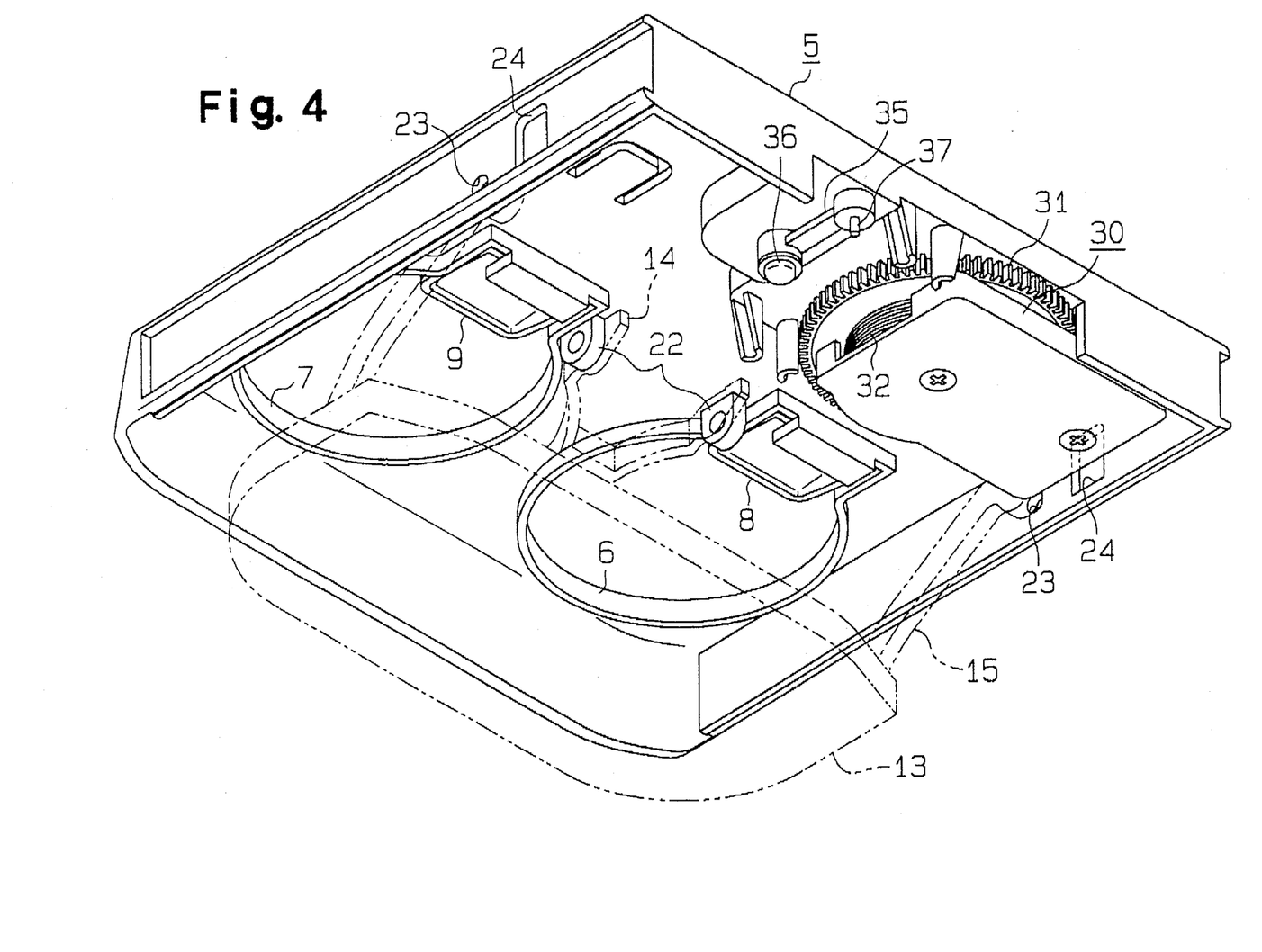
FIG. 4 is a perspective view showing the cup holder seen from the bottom of the holder body.

As shown in FIG. 4, a pair of bearings 22 are formed in the center of the upper surface of the body 5, for rotatably containing shafts 18 of front arm 14. Two shaft holes 23, for rotatably containing shafts 20, are formed in the left and right sides of the body 5, respectively. A window 24 is formed in the body 5 behind each of the holes 23.

In the above construction, the shafts 18 (shown in FIG. 3) of the front arm 14 are pivotally supported by the bearings 22 of the body 5 (shown in FIG. 4), while the shafts 20 (shown in FIG. 3) of the rear arms 15 are pivotally supported by the shaft holes 23 (shown in FIG. 4). The projections 21 of the rear arms 15 extend outward from the left and right of the body 5 through windows 24.

Figure 5:
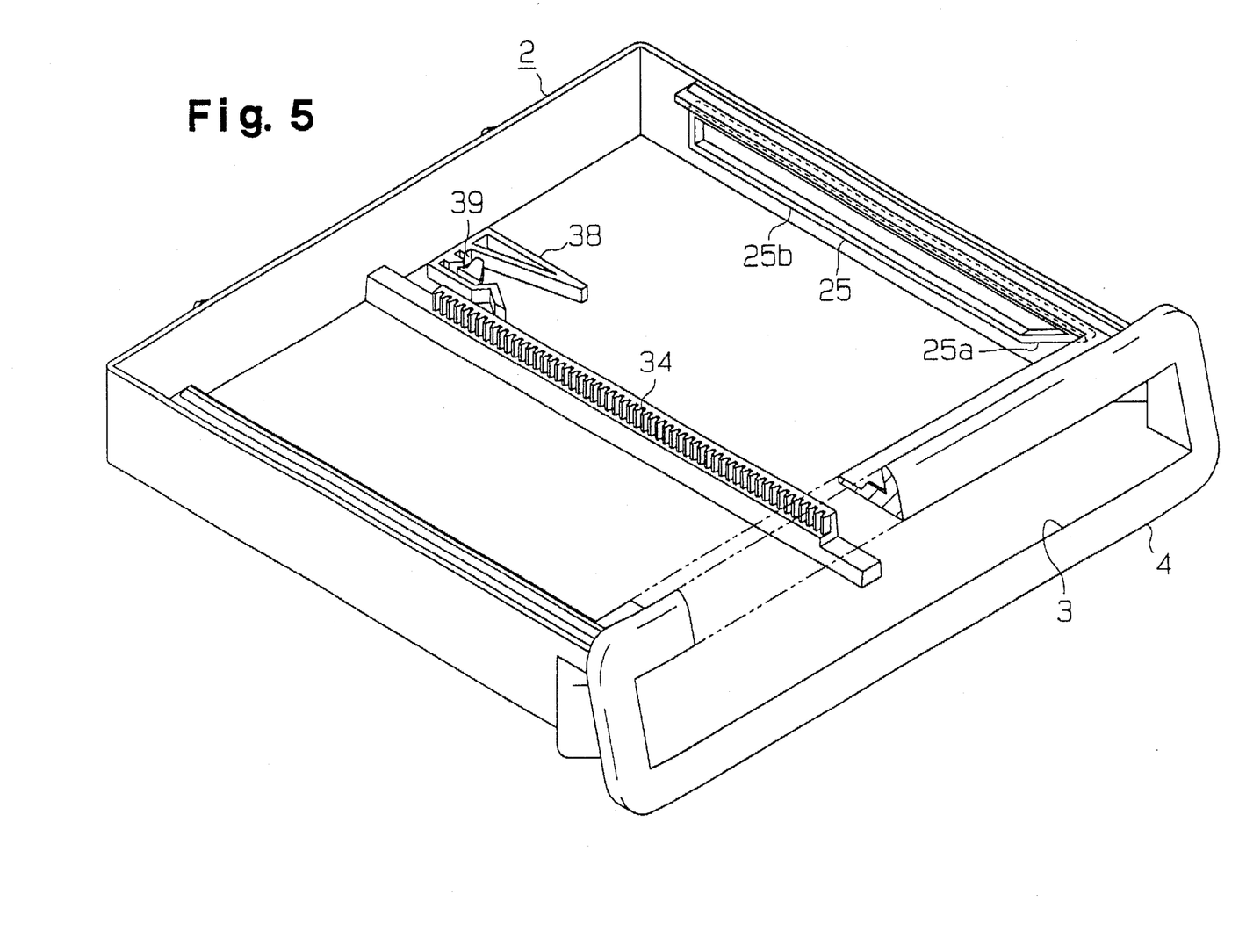
FIG. 5 is a perspective view showing the receptacle.

As shown in FIG. 5, guide rails 25 extending along the moving path of the body 5 are formed on each of the left and right walls of the receptacle 2. The guide rails 25 which serve as a cam, comprise an inclined portion 25a and a straight portion 25b. The inclined portion 25a is canted upward toward the front end of the receptacle 2. The straight portion 25b is formed continuously from the portion 25b extending backward. The projections 21 of rear arms 15 slide along the guide rails 25. The horizontal movement of the projections 21, guided by the straight portion 25b, regulates the pivoting of the rear arms 15. The inclined movement of the projections 21 is guided by the inclined portion 25a to force the rear arm 15 to pivot about the shaft 20, causing the cup tray 13 to be raised and lowered as the body 5 is inserted into and extracted from the receptacle 2.

In the cup holder 1 of the present embodiment, the body 5 may be pushed and inserted into the receptacle 2. A push-open mechanism, described below, allows the body 5 to be automatically extracted from the receptacle 2. The push-open mechanism will now be described.

As shown in FIG. 4, a drive section 30 is provided on the body 5. The drive section 30 comprises a drive gear 31, a spiral spring 32 which applies force on the gear 31 toward a single pivot direction, and a silicon damper (not shown) which engages with the gear 31. An engaging fitting 35 is provided pivotally about a shaft 36. A downwardly-extending pin 37 is formed on the fitting 35. As shown in FIG. 5, a rack 34 which engages the drive gear 31 is provided in receptacle 2. An engagement notch 39 for engaging pin 37 is formed in a retainer 38.

Figure 6:
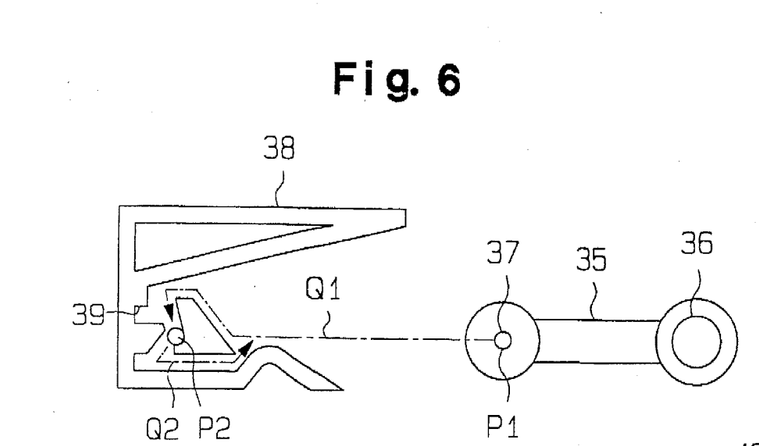
FIG. 6 is a schematic view showing the engaging status/of an engaging fitting and an engaging notch.

More specifically, the gear 31 engaging the rack 34 is rotated when the body 5 is inserted into the receptacle 2. This leads to the accumulation of potential (or biasing) energy in the spiral spring 32. As shown in FIG. 6, when body 5 is inserted in receptacle 2, the pin 37 of the fitting 35 moves from a first position P1 in the direction indicated by an arrow Q1. When the body 5 is completely inserted into the receptacle 2, the pin 37 is received within the engaging notch 39 at position P2. Subsequently, if the body 5 is further urged in the receptacle 2, the pin 37 disengages from the notch 39. This causes the potential energy accumulated in the spiral spring 32 to be released. This initiates the rotation of the drive gear 31 along rack 4, and the pin 37 is moved away from the position P2 toward the direction Q2. Accordingly, the body 5 is automatically extracted from the receptacle 2.

FIGS. 1(a) and 1(b) show the relative positions of the arms 14, 15 and the tray 13 during the extraction and insertion of the body 5. FIG. 1(a) illustrates the body 5 fully extracted from the receptacle 2. FIG. 1(b) illustrates the body 5 half-way inside the receptacle 2. The weight of the tray 13 applies force to the shafts 18, 20 in the counter-clockwise direction. As shown in FIG. 1(a), the ascent of the projections 21 along the inclined portion 25a of the guide rails 25 causes the arms 14, 15 to pivot in the counterclockwise direction, resulting in the lowering of the tray 13. The descent of the tray 13 and arms 14, 15, utilizing the inclined portion 25a of the guide rails 25, allows smooth movement of the tray 13, preventing the tray from jolting and rattling.

From the fully extracted position, the surface of the body 5 can be pushed and the body 5 inserted into the receptacle 2. As the projections 21 of the rear arms 15 advance downward along the inclined portion 25a, the arms 15 pivot clockwise about the shaft 20 thus lifting the tray 13. The lifting of the tray 13 is completed when the projections 21 reach the straight portion 25b. The advancement of the projections 21 along the inclined portion 25a again allows the tray 13 to be smoothly lifted up.

By further pushing the front surface of the body 5, the body 5 advances with the tray 13 kept raised until it is completely accommodated within the receptacle 2. The tray 13 is raised and held horizontal by the arms 14, 15 and is thus optimally accommodated in the receptacle 2.

Thereafter, the body 5 is urged slightly further toward the receptacle 2 and automatically extracted from the receptacle 2, by the potential energy of the spiral spring 32 as discussed above.

The construction of this embodiment enables the tray 13 to be kept parallel to the horizontal during its upward and downward movement. More specifically, the four-joint-link mechanism comprised of the body 5, tray 13 and arms 14, 15 realizes smooth movement of the tray 13. Spill over of the liquid is prevented because cups C are stably held. In the case of spill overs, the constant horizontal state of the cup tray 13 allows the spilt liquid to be received in the receiving recesses 16, 17. Thus, any spill overs of liquid from the cup C do not stain seats, etc. Accordingly, a cup holder meeting the recent preference for high quality goods is embodied herein.

While the present invention has been described with reference to a preferred embodiment, one of ordinary skill in the art will recognize that modifications and improvements may be made while remaining within the scope and spirit of the present invention. The following exemplary modifications can be made in the embodiment explained above.

The inclined portion 25a of the guide rail 25, which defines a straight line path for cam follower projections 21, can be modified to a rail defining a curved path. This enhances smooth movement of the tray 13 and arms 14, 15.

What is claimed is:

1. A cup holder, comprising:
   a body for holding a cup,
   a receptacle slidably engaged to said body and configured to allow the body to slide from a first retracted position wherein the body is inside the receptacle, to a second extracted position wherein at least a portion of the body is outside the receptacle and said body is configured to support said cup, the receptacle having a cam surface fixed thereto,
   a cup support member having a pivot for pivotally connecting the support member to the body and having a cam follower in continuous engagement with the cam surface of the receptacle, so as to cause the cup support member to pivot from a first raised position when the body is in the first retracted position to a second lowered position configured to support said cup when the body is in the second extracted position, with said cam follower remaining in engagement with said cam surface and disposed above said pivot.

2. The cup holder according to claim 1, wherein the weight of the cup holder creates a moment about said pivot which urges said cam follower against said cam surface.

3. The cup holder according to claim 2 wherein said cam follower includes a convex sliding surface for contacting said cam surface.

4. The cup holder according to claim 3 wherein said cam surface has a first linear horizontal portion and a second linear inclined portion.

5. The cup holder according to claim 1 further comprising a push-open mechanism operably connected to the body and including biasing means biasing the body toward the second position, and configured to be activated by pushing the body toward the receptacle when the body is in the first position.

6. A cup holder, comprising:
   a body for holding a cup,
   a receptacle slidably engaged to said body and configured to allow the body to slide from a first retracted position wherein the body is inside the receptacle, to a second extracted position wherein at least a portion of the body is outside the receptacle and said body is configured to support said cup, the receptacle having a cam surface fixed thereto,
   a cup support member having a pivot for pivotally connecting the support member to the body and having a cam follower, wherein the weight of the support member causes a moment about said pivot which urges the cam follower in continuous engagement with the cam surface of the receptacle, so as to cause the cup support member to pivot from a first raised position when the body is in the first retracted position to a second lowered position configured to support said cup when the body is in the second extracted position at least partially outside the receptacle, with said cam follower remaining in engagement with said cam surface and disposed above said pivot.

7. The cup holder according to claim 6 wherein said cam follower includes a convex sliding surface for contacting said cam surface.

8. The cup holder according to claim 7 wherein said cam surface has a first linear horizontal portion and a second linear inclined portion.

9. A cup holder, comprising:
   a body for holding a cup,
   a receptacle slidably engaged to said body and configured to allow the body to slide from a first retracted position wherein the body is inside the receptacle, to a second extracted position wherein at least a portion of the body is outside the receptacle and said body is configured to support said cup, the receptacle having a cam surface fixed thereto,
   a cup support member having a pivot for pivotally connecting the support member to the body and having a cam follower with a convex sliding surface, wherein the weight of the support member causes a moment about said pivot which urges the convex sliding surface of cam follower in continuous engagement with the cam surface of the receptacle, so as to cause the cup support member to pivot from a first raised position when the body is in the first retracted position to a second lowered position configured to support said cup when the body is in the second extracted position at least partially outside the receptacle, with said cam follower remaining in engagement with said cam surface and disposed above said pivot.

10. The cup holder according to claim 9 wherein said cam surface has a first linear horizontal portion and a second linear inclined portion.

11. A cup holder, comprising:
    a body for holding a cup,
    a receptacle slidably engaged to said body and configured to allow the body to slide from a first retracted position wherein the body is inside the receptacle, to a second extracted position wherein at least a portion of the body is outside the receptacle and said body is configured to support said cup, the receptacle having a cam surface fixed thereto,
    a cup support member pivotally connected to the body and having a cam follower in continuous engagement with the cam surface of the receptacle, so as to cause the cup support member to pivot from a first raised position when the body is in the first retracted position to a second lowered position configured to support said cup when the body is in the second extracted position
    said cup support member including a pivot for pivotally connecting said cup support to said body and wherein the weight of the cup holder creates a moment about said pivot which urges said cam follower against said cam surface,
    said cam follower including a convex sliding surface for contacting said cam surface,
    wherein said cam surface has a first linear horizontal portion linear and a second linear inclined portion.

12. The cup holder according to claim 11, wherein said cup support member comprises
    a cup tray,
    a first arm having a bottom end pivotally connected to the cup tray and a top end pivotally connected with the body by said pivot,
    a second arm having a bottom end pivotally connected with the cup tray and a top end pivotally connected with the body, wherein the first and second arms maintain the cup tray horizontal as the support member moves from the first position to the second position.

13. The cup holder according to claim 12, wherein said cup support member is kept in the first raised position when said cam follower engages said first portion of the cam surface, and said cup support is moved to and from the second lowered position when said follower engages said second portion of the cam surface.

14. The cup holder according to claim 13, wherein said body defines at least one aperture for receiving said cup.

15. The cup holder according to claim 14, wherein said tray includes at least one recess, aligned with said aperture, for receiving a bottom portion of said cup when the cup support is in the second lowered position.

16. A cup holder, comprising:

a body for holding a cup, a receptacle slidably engaged to said body and configured to allow the body to slide from a first retracted position wherein the body is inside the receptacle, to a second extracted position wherein at least a portion of the body is outside the receptacle and said body is configured to support said cup, the receptacle having a cam surface fixed thereto, a cup support member pivotally connected to the body and having a cam follower in continuous engagement with the cam surface of the receptacle, so as to cause the cup support member to pivot from a first raised position when the body is in the first retracted position to a second lowered position configured to support said cup when the body is in the second extracted position, and a push-open mechanism operably connected to the body and including biasing means biasing the body toward the second position, and configured to be activated by pushing the body toward the receptacle when the body is in the first position.

17. The cup holder according to claim 16, wherein the biasing means comprises a rack, a gear engaging the rack and a spiral spring operably connected to the gear, wherein the spring is wound when the body is in the first position to bias the body toward the second position, and a release mechanism adapted to lock the body in the first position and release when the body is pushed toward the receptacle.

18. A cup holder, comprising:

a body for holding a cup, a receptacle slidably engaged to said body and configured to allow the body to slide from a first retracted position wherein the body is inside the receptacle, to a second extracted position wherein at least a portion of the body is outside the receptacle and said body is configured to support said cup, the receptacle having a cam surface fixed thereto, a cup support member having a pivot for pivotally connected the support member to the body and having a cam follower, wherein the weight of the support member causes a moment about said pivot which urges the cam follower in continuous engagement with the cam surface of the receptacle, so as to cause the cup support member to pivot from a first raised position when the body is in the first retracted position to a second lowered position configured to support said cup when the body is in the second extracted position at least partially outside the receptacle, said cam follower including a convex sliding surface for contacting said cam surface, wherein said cam surface has a first linear horizontal portion and a second linear inclined portion.

19. The cup holder according to claim 18, wherein said cup support member comprises a cup tray, a first arm having a bottom end pivotally connected to the cup tray and a top end pivotally connected with the body by said pivot, a second arm having a bottom end pivotally connected with the cup tray and a top end pivotally connected with the body, wherein the first and second arms maintain the cup tray horizontal as the support member moves from the first position to the second position.

20. The cup holder according to claim 19, wherein said cup support member is kept in the first raised position when said cam follower engages said first portion of the cam surface, and said cup support is moved to and from the second lowered position when said follower engages said second portion of the cam surface.

21. The cup holder according to claim 20, wherein said body defines at least one aperture for receiving said cup.

22. The cup holder according to claim 21, wherein said tray includes at least one recess, aligned with said aperture, for receiving a bottom portion of said cup when the cup support is in the second lowered position.

23. A cup holder, comprising:

a body for holding a cup, a receptacle slidably engaged to said body and configured to allow the body to slide from a first retracted position wherein the body is inside the receptacle, to a second extracted position wherein at least a portion of the body is outside the receptacle and said body is configured to support said cup, the receptacle having a cam surface fixed thereto, a cup support member having a pivot for pivotally connecting the support member to the body and having a cam follower with a convex sliding surface, wherein the weight of the support member causes a moment about said pivot which urges the convex sliding surface of cam follower in continuous engagement with the cam surface of the receptacle, so as to cause the cup support member to pivot from a first raised position when the body is in the first retracted position to a second lowered position configured to support said cup when the body is in the second extracted position at least partially outside the receptacle, wherein said cam surface has a first linear horizontal portion and a second linear inclined portion.

24. The cup holder according to claim 23, wherein said cup support member comprises a cup tray, a first arm having a bottom end pivotally connected to the cup tray and a top end pivotally connected with the body by said pivot, a second arm having a bottom end pivotally connected with the cup tray and a top end pivotally connected with the body, wherein the first and second arms maintain the cup tray horizontal as the support member moves from the first position to the second position.

25. The cup holder according to claim 24, wherein said cup support member is kept in the first raised position when said cam follower engages said first portion of the cam surface, and said cup support is moved to and from the second lowered position when said follower engages said second portion of the cam surface.

26. The cup holder according to claim 25, wherein said body defines at least one aperture for receiving said cup.

27. The cup holder according to claim 26, wherein said tray includes at least one recess, aligned with said aperture, for receiving a bottom portion of said cup when the cup support is in the second lowered position.

* * * * *